(12) United States Patent
Wade

(10) Patent No.: US 7,409,310 B1
(45) Date of Patent: Aug. 5, 2008

(54) SYSTEM AND METHOD FOR TRACKING OPERATIONAL DATA IN A DISTRIBUTED ENVIRONMENT

(75) Inventor: Jack P. Wade, La Jolla, CA (US)

(73) Assignee: Z Microsystems, Inc., San Diego, CA (US)

( * ) Notice: Subject to any disclaimer, the term of this patent is extended or adjusted under 35 U.S.C. 154(b) by 589 days.

(21) Appl. No.: 11/040,161

(22) Filed: Jan. 21, 2005

(51) Int. Cl.
    *G06F 17/60* (2006.01)
(52) U.S. Cl. .......................... 702/130; 702/127; 707/2; 707/200; 707/208; 707/223; 711/162
(58) Field of Classification Search ................ 702/130, 702/127; 707/2, 200, 208, 223; 711/162; 709/208, 223
See application file for complete search history.

(56) References Cited

U.S. PATENT DOCUMENTS

| | | | |
|---|---|---|---|
| 4,750,197 A | 6/1988 | Denekamp et al. | 455/404.2 |
| 4,823,290 A | 4/1989 | Fasack et al. | 340/825.01 |
| 4,849,614 A | 7/1989 | Watanabe et al. | 235/379 |
| 4,882,564 A | 11/1989 | Monroe et al. | 340/449 |
| 4,899,217 A | 2/1990 | MacFadyen et al. | 725/80 |
| 4,942,606 A | 7/1990 | Kaiser et al. | 713/202 |
| 4,947,163 A | 8/1990 | Henderson et al. | 340/5.25 |
| 5,051,720 A | 9/1991 | Kittirutsunetorn | 340/310.02 |
| 5,111,185 A | 5/1992 | Kozaki | 340/5.5 |
| 5,144,659 A | 9/1992 | Jones | 713/165 |
| 5,552,776 A | 9/1996 | Wade et al. | 340/5.74 |
| 6,144,992 A | 11/2000 | Turpin et al. | 709/208 |
| 6,907,506 B2 | 6/2005 | Proidl | 711/162 |
| 6,951,029 B2 | 9/2005 | Kamperman et al. | 725/25 |
| 2001/0005901 A1 | 6/2001 | Kamperman et al. | 725/40 |
| 2002/0010808 A1 | 1/2002 | Wiggins et al. | 709/328 |
| 2003/0079098 A1 | 4/2003 | Proidl | 711/162 |
| 2004/0003415 A1 | 1/2004 | Ng | 725/151 |
| 2004/0158474 A1* | 8/2004 | Karschnia | 705/1 |
| 2004/0162894 A1 | 8/2004 | Griffin et al. | 709/223 |
| 2004/0243827 A1 | 12/2004 | Aguilera et al. | 713/200 |
| 2005/0144155 A1 | 6/2005 | Van Vlimmeren | 707/2 |
| 2005/0165853 A1 | 7/2005 | Turpin et al. | 707/200 |

OTHER PUBLICATIONS http://www.altiris.com/ products/smartmanage/mmdemo 2 webpages entitled Philips Smartmanage Tour, printed Apr. 26, 2005.

(Continued)

*Primary Examiner*—John E Barlow, Jr.
*Assistant Examiner*—Sujoy K Kundu
(74) *Attorney, Agent, or Firm*—Fitch, Even, Tabin & Flannery

(57) ABSTRACT

A system and method is provided for obtaining and utilizing operational information for a plurality of displays in a distributed computing system. The system can provide for a plurality of base units which are coupled with a plurality of displays. The displays operation to collect and store operational data which can then be transmitted to the base units. The base units can be coupled to a network, and through the network operation data for the displays can be transmitted to an administrative computer. The administrative computer can then store and the analyze the operational data for the plurality of displays. This analysis can be used to identify under utilized assets, and to identify displays which have been operated under conditions which suggest a need for replacement, or servicing.

17 Claims, 14 Drawing Sheets

OTHER PUBLICATIONS http://www.altiris.com/ products/smartmanage/ smartmanage.asp 2 webpages entitled Philips Learn About SmartManage, printed Dec. 27, 2005.

http://altiris.com/products/smartmanage/ 1 page web page entitled Philips Smartmage, and 4 PDF pages from link (Download Philips Smart Manage Data sheet) (total 1 web page and 4 PDF pages (5 pages)), printed Dec. 27, 2005.

In re U.S. Appl. No. 10/754,934, filed Jan. 9, 2004, by Jack P. Wade et al., entitled "System and Method for Switching Data Storage Devices and Multiple Processors," 23 pages in length.

* cited by examiner

600

| Mnuemonic | Description | Type | Size | Default | mod | |
|---|---|---|---|---|---|---|
| fsn | Serial Number | ASCII String | 10 | All 0x20 | N | 602 |
| fmn | Model Number | ASCII String | 10 | All 0x20 | N | 604 |
| fpo | P.O. Number | ASCII String | 16 | All 0x20 | N | 606 |
| fdp | Date of Purchase | ASCII String | 8 | 1011970 | N | 607 |
| fdm | Date of Manufacture | ASCII String | 8 | 1011970 | N | 608 |
| fcm | Cage Number | ASCII String | 6 | All 0x20 | N | 610 |
| fwty | Warranty | ASCII String | 4 | All 0x20 | N | 612 |

| Mnuemonic | Description | Type | Size | Default | mod | |
|---|---|---|---|---|---|---|
| fcpca | Controller Board PCA Number | ASCII String | 10 | All 0x20 | N | 616 |
| fcfv | Controller Firmware Version | ASCII String | 4 | All 0x20 | N | 618 |
| fbsn | Board Serial Number | ASCII String | 10 | All 0x20 | N | 620 |
| fbmn | Board Model Number | ASCII String | 10 | All 0x20 | N | 622 |

| Mnuemonic | Description | Type | Size | Default | mod | |
|---|---|---|---|---|---|---|
| fsoht | Spec High Operating Temp | ASCII String | 3 | All 0x20 | N | 626 |
| fsolt | Spec Low Operating Temp | ASCII String | 3 | All 0x20 | N | 628 |
| fsnoht | Spec High Non Operating Temp | ASCII String | 3 | All 0x20 | N | 630 |
| fsnolt | Spec Low Non Operating Temp | ASCII String | 3 | All 0x20 | N | 632 |
| fseoht | Spec High Extended Temp | ASCII String | 3 | All 0x20 | N | 634 |
| fseolt | Spec Low Extended Temp | ASCII String | 3 | All 0x20 | N | 636 |

FIG. 6C

| Mnuemonic | Description | Type | Size | Default | mod | |
|---|---|---|---|---|---|---|
| Idt | Date of Use | ASCII String | 8 | All 0x20 | N | — 640 |
| Its | Time of Use | ASCII String | 4 | All 0x20 | N | — 642 |
| Iut | Elapsed Usage Time | ASCII String | 4 | All 0x20 | N | — 644 |
| Ilu | Workstation Name | ASCII String | 16 | All 0x20 | Y | — 646 |

FIG. 6D

| Entry Number | Date Used | Time Used | Elapsed Usage | Host Name |
|---|---|---|---|---|
| 1 | 8 bytes | 4 bytes | 4 bytes | 16 bytes |
| 2 | 8 bytes | 4 bytes | 4 bytes | 16 bytes |
| 3 | 8 bytes | 4 bytes | 4 bytes | 16 bytes |
| ... | 8 bytes | 4 bytes | 4 bytes | 16 bytes |
| 96 | 8 bytes | 4 bytes | 4 bytes | 16 bytes |

FIG. 6E

| Mnuemonic | Description | Type | Size | Default | Mod | |
|---|---|---|---|---|---|---|
| ppc | Total Power Cycles | Binary | 2 | 0x0000 | N | — 662 |
| ptu | Cumulative Time Used | Binary | 4 | 0x00000000 | N | — 664 |
| ptd | Cumulative Time Down | Binary | 4 | 0x00000000 | N | — 666 |
| pct | Current Elapsed Time Used | Binary | 4 | 0x00000000 | N | — 668 |
| pat | Average Temperature | Binary | 2 | 0xFFFF | N | — 670 |
| pht | Highest Temperature | Binary | 2 | 0xFFFF | N | — 672 |
| plt | Lowest Temperature | Binary | 2 | 0xFFFF | N | — 674 |
| pttas | Time Temp Above Spec | Binary | 4 | 0x00000000 | N | — 676 |
| pttbs | Time Temp Below Spec | Binary | 4 | 0x00000000 | N | — 678 |
| pcsd | Brightness/Time Sample Data | Binary | 1024 | All 0x00 | N | — 680 |
| pbui | Temperature/Time Sample Data | Binary | 384 | 0x0F | N | — 682 |
| pbsd | Current/Time Sample Data | Binary | * | All 0x00 | N | — 684 |

FIG. 6F

| Mnuemonic | Description | Type | Size | Default | Mod | |
|---|---|---|---|---|---|---|
| udt1 | First Data Type | ASCII String | 12 | Asset Id | Y | — 688 |
| udt2 | Second Data Type | ASCII String | 12 | Project | Y | — 690 |
| udt3 | Third Data Type | ASCII String | 12 | Program | Y | — 692 |
| udv1 | First Data Type Value | ASCII String | 16 | All 0x20 | Y | — 694 |
| udv2 | Second Data Type Value | ASCII String | 16 | All 0x20 | Y | — 696 |
| udv3 | Third Data Type Value | ASCII String | 16 | All 0x20 | Y | — 698 |
| use | Security Enabled | ASCII String | 1 | 0x30 | Y | — 687 |
| uln | Login Enabled | ASCII String | 1 | 0x30 | Y | — 689 |
| ulg | Logging Enabled | ASCII String | 1 | 0x30 | Y | — 691 |
| uap | Admin Password | ASCII String | 12 | ADMIN | Y | — 693 |

FIG. 6G

| | 702 | | | | | | | |
|---|---|---|---|---|---|---|---|---|
| Device: All Modules | | | | | | | | Options |
| ↓ Identity | Start Time | User | Authority | Session IO | Elapsed Time | 30 Day Use | 90 Day Use | 360 Day Use |
| Strategy | 06/22/02 05:53:56 | P.LEE | 626 LHL | 18210 | 01:41:10 | 00:00:00 | 00:00:00 | 00:00:00 |
| Strategy | 05/12/02 07:46:25 | B.JOHNSON | 444 EEE | 30776 | 01:22:52 | 00:00:00 | 00:00:00 | 00:00:00 |
| Strategy | 06/10/02 20:53:02 | H.WRIGHT | 626 LHL | 63711 | 02:07:53 | 00:00:00 | 00:00:00 | 00:00:00 |
| Strategy | 03/15/02 06:23:41 | B.JOHNSON | 222 LLL | 0318 | 00:26:53 | 00:00:00 | 00:00:00 | 00:00:00 |
| Strategy | 03/29/02 13:43:39 | J.WADE | 222 LLL | 18036 | 02:30:18 | 00:00:00 | 00:00:00 | 00:00:00 |
| Strategy | 02/02/02 15:27:43 | T.SMITH | 444 EEE | 35584 | 02:28:11 | 00:00:00 | 00:00:00 | 00:00:00 |
| Strategy | 02/07/02 01:47:39 | H.WRIGHT | 444 EEE | 0 | 00:07:03 | 00:00:00 | 00:00:00 | 00:00:00 |
| Strategy | 12/29/01 04:57:22 | P.LEE | 626 LHL | 35702 | 01:41:57 | 00:00:00 | 00:00:00 | 00:00:00 |
| Strategy | 01/04/02 09:29:00 | P.LEE | 444 EEE | 11517 | 01:03:59 | 00:00:00 | 00:00:00 | 00:00:00 |
| Strategy | 07/27/01 03:29:56 | H.WRIGHT | 626 LHL | 60680 | 01:45:35 | 00:00:00 | 00:00:00 | 00:00:00 |
| Strategy | 12/08/01 02:27:40 | T.SMITH | 626 LHL | 41244 | 01:39:12 | 00:00:00 | 00:00:00 | 00:00:00 |
| Sales | 05/04/02 05:05:23 | H.WRIGHT | 444 EEE | 17424 | 01:12:36 | 00:00:00 | 00:00:00 | 00:00:00 |
| Sales | 05/07/02 08:19:57 | P.LEE | 222 LLL | 0 | 01:33:33 | 00:00:00 | 00:00:00 | 00:00:00 |
| Sales | 02/25/02 19:56:15 | J.WADE | 444 EEE | 605 | 00:02:01 | 00:00:00 | 00:00:00 | 00:00:00 |
| Sales | 04/08/02 00:37:16 | P.LEE | 626 LHL | 89263 | 02:45:17 | 00:00:00 | 00:00:00 | 00:00:00 |
| Sales | 11/30/01 06:41:16 | T.SMITH | 444 EEE | 1560 | 00:13:10 | 00:00:00 | 00:00:00 | 00:00:00 |
| Sales | 02/01/02 00:00:33 | B.JOHNSON | 626 LHL | 55446 | 01:55:31 | 00:00:00 | 00:00:00 | 00:00:00 |
| Sales | 11/03/01 14:03:54 | B.JOHNSON | 444 EEE | 18672 | 00:51:52 | 00:00:00 | 00:00:00 | 00:00:00 |
| Sales | 11/25/01 15:40:30 | H.WRIGHT | 626 LHL | 0 | 02:03:50 | 00:00:00 | 00:00:00 | 00:00:00 |
| Sales | 08/14/01 20:44:24 | T.SMITH | 444 EEE | 71320 | 02:28:35 | 00:00:00 | 00:00:00 | 00:00:00 |
| Sales | 10/10/01 04:08:24 | T.SMITH | 444 EEE | 13959 | 01:17:33 | 00:00:00 | 00:00:00 | 00:00:00 |
| Plans | 04/03/02 09:28:02 | T.SMITH | 444 EEE | 0 | 02:20:59 | 00:00:00 | 00:00:00 | 00:00:00 |
| Plans | 05/21/02 06:52:54 | H.WRIGHT | 222 LLL | 6840 | 01:13:40 | 00:00:00 | 00:00:00 | 00:00:00 |
| Plans | 06/02/01 11:02:57 | T.SMITH | 222 LLL | 52982 | 01:50:38 | 00:00:00 | 00:00:00 | 00:00:00 |
| Plans | 12/28/01 13:58:51 | H.WRIGHT | 626 LHL | 4406 | 00:10:38 | 00:00:00 | 00:00:00 | 00:00:00 |
| Plans | 07/13/01 14:26:58 | J.WADE | 222 LLL | 30132 | 01:23:42 | 00:00:00 | 00:00:00 | 00:00:00 |
| Plans | 07/31/01 07:55:33 | T.SMITH | 222 LLL | 32400 | 01:30:00 | 00:00:00 | 00:00:00 | 00:00:00 |
| Plans | 07/10/01 00:34:03 | P.LEE | 444 EEE | 58416 | 02:18:22 | 00:00:00 | 00:00:00 | 00:00:00 |
| Payroll | 04/26/02 06:27:53 | H.WRIGHT | 626 LHL | 7118 | 00:59:18 | 00:00:00 | 00:00:00 | 00:00:00 |
| Payroll | 06/10/02 10:12:02 | B.JOHNSON | 444 EEE | 3942 | 00:21:54 | 00:00:00 | 00:00:00 | 00:00:00 |
| Payroll | 03/26/02 13:42:03 | J.WADE | 626 LHL | 10482 | 01:27:21 | 00:00:00 | 00:00:00 | 00:00:00 |
| Total: | | | | 2268002 | 134:26:42 | 00:00:00 | 00:00:00 | 00:00:00 |

SYSTEM AND METHOD FOR TRACKING OPERATIONAL DATA IN A DISTRIBUTED ENVIRONMENT

FIELD OF THE INVENTION

The present invention relates to a system and method which provides for tracking assets and operational data of display in a distributed computing system.

BACKGROUND

For a number of different distributed computing environments, systems can now utilize a wide range of different modular and interchangeable components. For example, one computing environment could provide for a number of different personal computers, with each computer being coupled with different interchangeable computing modules. Different modules could include hard disc drives, optical drives, flash memory devices, or a myriad of other storage of processing devices, and could include devices such as displays or monitors. In some computing environments where computers and modules are used in secure environments, such as some military applications, intelligence operations, and research and development facilities, it may be desirable to limit access to use of certain modules to particular locations, people, computers, or other modules. Further, in addition to providing for control over access to different modules it can be desirable to provide a method for tracking which people have accessed different modules in the system. U.S. Pat. No. 5,552,776 (the '776 patent), entitled ENHANCED SECURITY SYSTEM FOR COMPUTING DEVICES, to Wade et al., and assigned to the same assignee as the present application, teaches among other things a system which provides for controlling access or use of different memory modules in computing system, and this patent is incorporated herein by reference. Additional elements and embodiments of systems utilizing different interchangeable memory storage modules are also described in pending U.S. patent application Ser. No. 10/754,934, filed Jan. 9, 2004, entitled SYSTEM AND METHOD FOR SWITCHING DATA STORAGE DEVICES AND MULTIPLE PROCESSORS, which is assigned to the same assignee as the present application, and which is incorporated herein by reference.

The '776 patent teaches aspect of using different memory tables in different computing to provide for security and access control over different computing devices coupled with a docking base unit.

BRIEF DESCRIPTION OF THE DRAWINGS

FIGS. 6A-6G shows embodiments of data tables of system herein.

FIGS. 7A-7C show images from an embodiment of an administrative computer herein.

DETAILED DESCRIPTION

Figure 1:
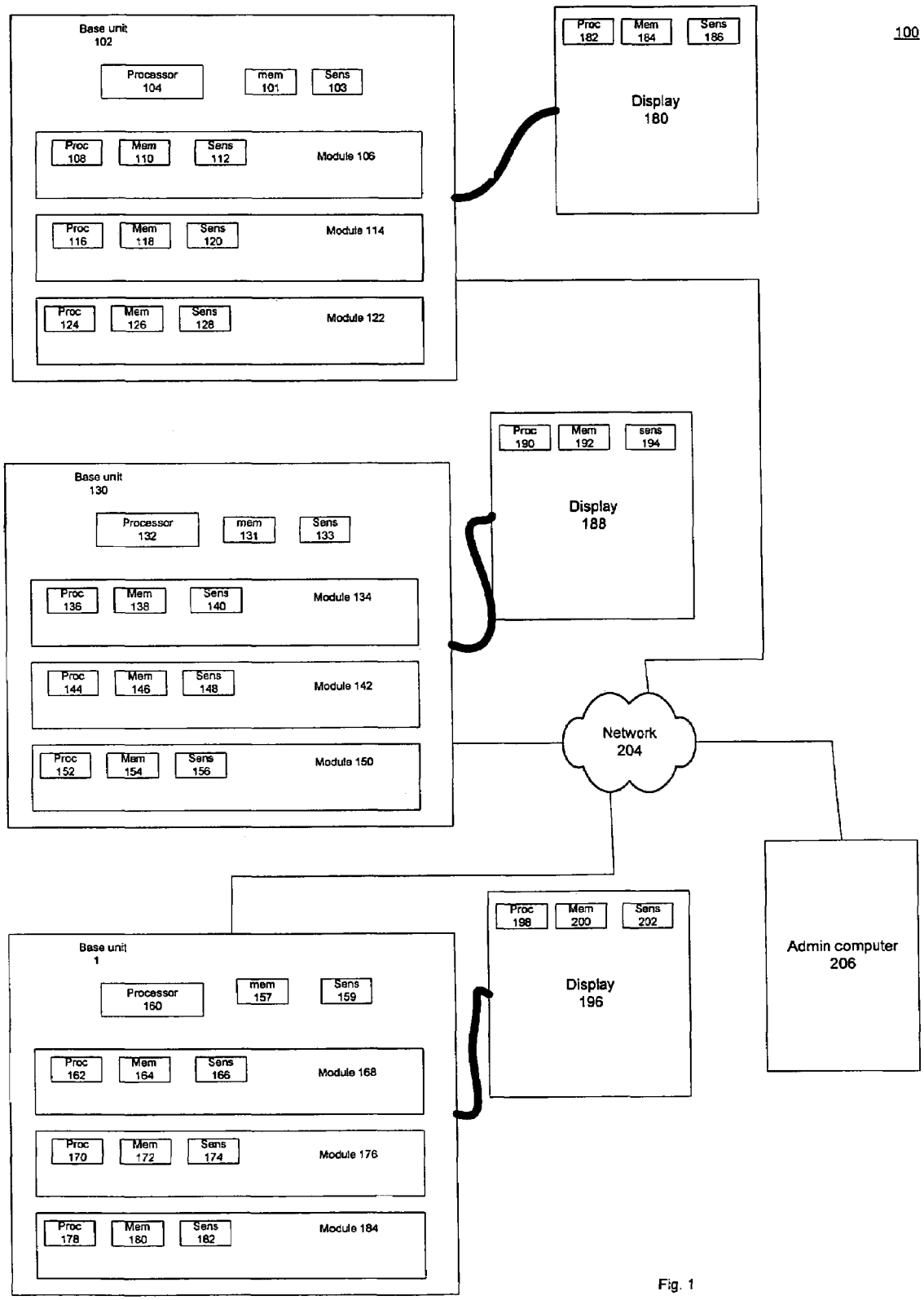
FIG. 1 shows an embodiment of a system herein.

FIG. 1 shows an embodiment of a distributed computing system 100 of the present invention. The system 100 as shown includes 3 docking base units 102, 130 and 158. There could of course be many more docking base units included in the system 100. In one embodiment each docking base unit will include a pc board with multiple connectors for mating with connectors from different interchangeable modules. The interchangeable modules are then coupled with a communications bus on the docking base pc board through the connectors. For example, docking base unit 102 is shown as being coupled with removable modules 106, 114 and 122. These interchangeable modules can each be provided with processors 108, 116 and 124 respectively. Further, each of the modules can be provided with a memory 110, 118 and 126, and each of the modules can be provided with sensors 112, 120 and 128. The interchangeable modules can include individual storage devices, such a magnetic disk drives, optic storage devices, CD drives, DVD drives, and the interchangeable module could include multiple drives configured in a RAID configuration.

The docking base units can include a processor. For example, docking base unit 102 includes a processor 104. The docking base units can also include a memory and sensors. For example base unit 102 includes a memory 101 and sensors 103. Although, not shown in detail in FIG. 1 the base unit 102 can include a communication bus and the communication bus can connect the sensors 103 and the memory 101 with the processor 104, and the communication bus can also connect the processor with the interchangeable modules 106, 114, and 122.

Each of the interchangeable modules can also include a processor, memory and sensors as shown in FIG. 1. The docking base units 102, 130 and 158 can include all of the elements which would normally be included in a personal computer. The processors 104, 132 and 160 of the docking base units can allow for user input from a user input device such as a key board and a mouse which could be coupled with the docking base unit, and the docking base unit could be coupled with a computer display shown as displays 180, 188 and 196. These displays can each include a processor, memory and sensor which provide for asset tracking functions as described in more detail below.

The processors of the docking base unit can also allow for communications over a communication network 204, where a network port is provided on the docking base unit. The operation of the system allows for an administrative computer 206 to be coupled to the network 204. The administrative computer can monitor the operation, and asset tracking data for each of docking base units coupled to the network. More specifically in one embodiment the administrative computer can store asset tracking data for all of the docking base units, displays and interchangeable modules of the distributed system, 100, and an administrator can access this data to optimize the management of different components or assets of the overall system 100.

Figure 3:
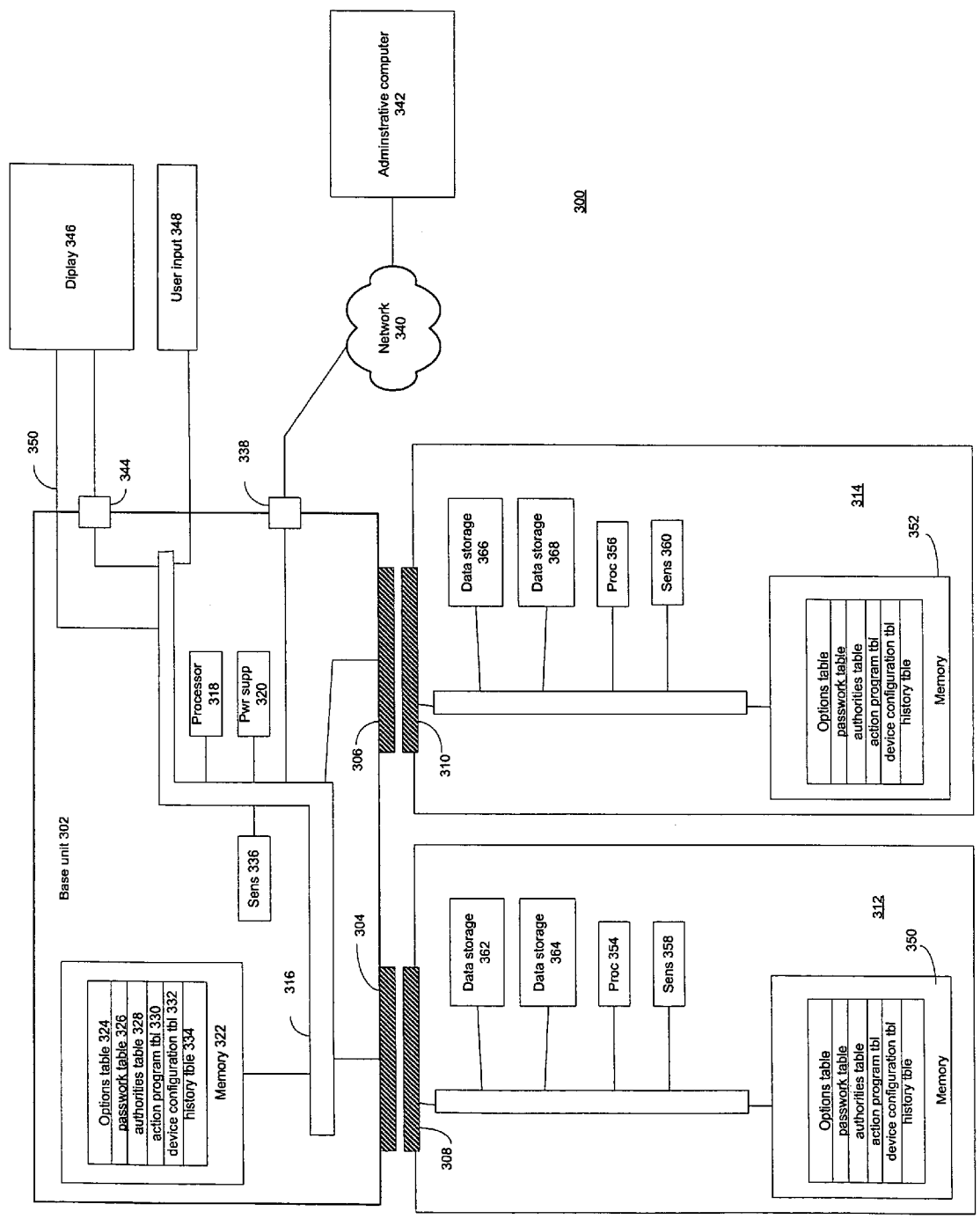
FIG. 3 shows an embodiment of a system herein.

FIG. 3 shows another embodiment of a system 300 which is similar to the system 100 shown in FIG. 1, but additional details of the system area shown. The docking base unit 302 has connectors 304 and 306 which are coupled to connectors 308 and 310 of the interchangeable computing modules 312 and 314. The docking base unit 302 includes a bus 316. The bus 316 can provide for communications between different elements of the system. The processor 318 of the docking base unit 302 provides for control over various elements of the system. The processor 318 can control operation of the power supply 320. The power supply can output power to drive the different elements of the system, and the power supply can provide power through the connectors 304 and 306 to different interchangeable computing modules coupled with the connectors. The lines providing power to different elements of the system are not shown. As shown in FIG. 3, a memory device 322, such as a non-volatile EEPROM memory device can store information in various tables. A detailed description of different elements which could be included in the various tables shown in FIG. 3 is in the '776 patent referred to above, and incorporated by reference herein.

The options table 324 can include a list of system parameters which an administrator can set to provide for different security levels for different devices. The system parameters can include an identification of which users can access specific device, set the maximum number of users which can access a device, control the types of data which will be shown on a display, and the types of data which can be written to or removed from a storage device.

The password table 326 can be used to control log on validation at a user or project level. The password table 326 can provide a list of various users and their corresponding passwords, and provide for a logon sequence which a user must execute to gain access to a device. This password table could require that a user specify a particular project for which a user seeks to access removable processing module.

The authorities table 328 can be used to further customize control over access to data stored in a removable processing module. For example, the authorities data could specify that certain data is write-protected, or that certain data can only be accessed during particular time periods, or provide that a user is only allowed to access certain data a limited number of times.

The action table 330 can be provided for implementing interpretative data function processing. Further, the action table can specify certain actions which should be implemented by the processor in response to an occurrence of specified events.

The device configuration table 332 can store a unique identifier code for a particular device, so that it can identify itself to other devices. The device configuration could also include an identification of other devices with which a device can communicate or perform input/output operations with.

The history table 334 can include a transactional log which sets forth usage history of the computing device. The history table can provide reports showing for example which users accessed different devices through a particular device. The history table can provide an audit table showing which devices communicated with a particular device, and the times at which such communications took place. The history table can also include a log of various environmental conditions as detected by various sensors 336.

The above tables are examples and of course a range of other tables and functions could be provided. Also, while much of the discussion above is directed to the elements of the docking base unit, it should be noted that each of the interchangeable modules can also include a memory, processor and sensor which would perform the same type of security operations for each of the interchangeable modules. As shown in FIG. 3, the interchangeable modules 312 and 314 each include a memory 350 and 352, and processors 354 and 356 and sensors 358 and 360 respectively. The interchangeable modules also have storage devices 362-368 as shown. Additionally, as described in more detail below (particularly in connection with FIG. 5) the display can include a processor, a memory device and a sensor system which are communicatively connected with each other, and operate cooperatively to sense operating conditions of the display, and to process and store data corresponding to the operating conditions of the display in the memory of the display.

Figure 4:
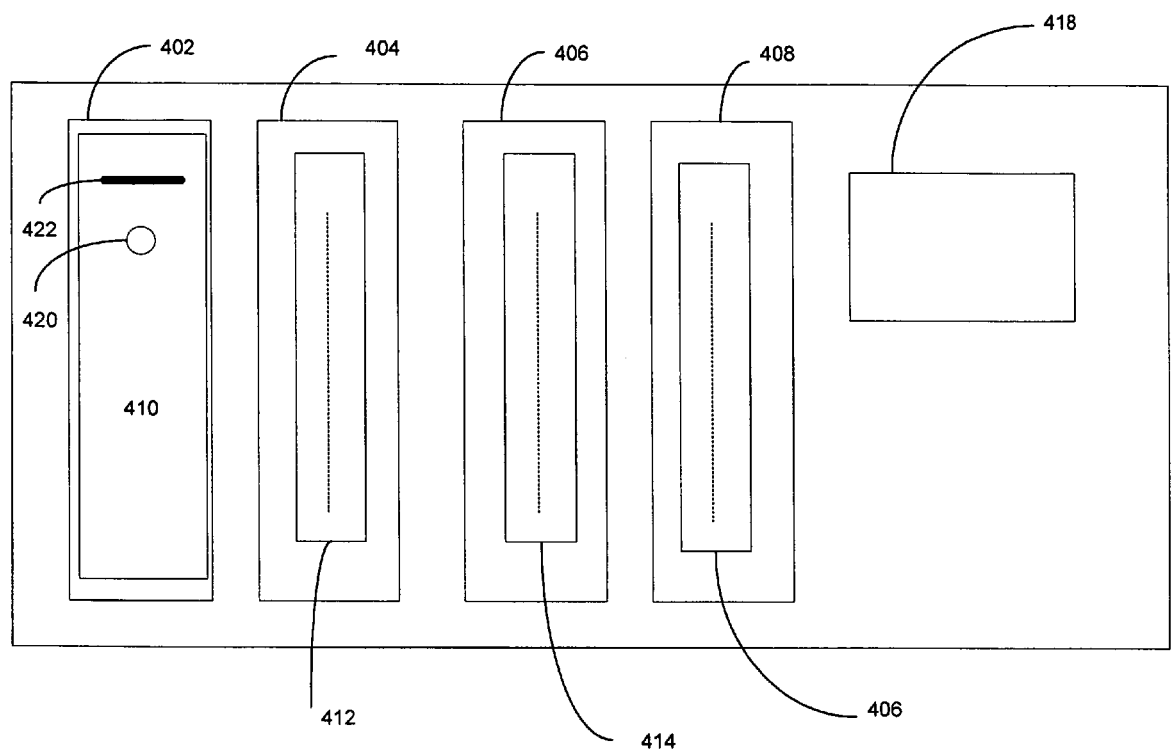
FIG. 4 shows a front view of an embodiment of a docking base unit herein.

FIG. 4 shows a front view of an embodiment of a docking base unit 400. As shown the docking base unit 400 has four receptacles 402-408 for receiving removable disk drive modules. Receptacle 402 is shown as having an interchangeable module 410 inserted into the receptacle. The interchangeable module 410 can include one or more LEDS 420 which can display information about the state of operation of the interchangeable module 410. Additionally, the interchangeable module can include a cam lever arm 422 as shown where a user can pull on the lever arm 422 to allow the interchangeable module 410 to be removed from the receptacle. A connector of the interchangeable module would be mated with a connector of a docking base unit. In each of the receptacles 404-408, connectors 412-416 are shown. Each of the connectors would be coupled to a docking base backplane in the docking base unit chassis and computers could also be coupled to the docking base. A user interface panel 418 can also provided. This panel can provide the user with information about the state of operation of the docking base unit 400. In one embodiment the docking base unit will include one or more power supplies, where the docking base unit 400 can be plugged into a power source and via the connectors of the docking base, power can be provided to each of the interchangeable modules inserted into the receptacles. In one embodiment of the docking base unit, on a back panel of the docking base unit, not shown, a number of connectors are provided for connecting the docking base unit and its processor and other elements, such as a display, keyboard, communication network, and possibly a computer, and other devices.

It is important to note that while the above embodiment is shown in the context of a docking base unit having receptacles for housing various interchangeable processing modules. An embodiment of a system herein could be implemented using a general purpose type personal computer, where the personal computer is programmed to implement the asset tracking functions described above in connection with docking base unit. For example, a user might have a personal computer which is connected with various interchangeable storage devices via connectors on the back of the personal computer, and different displays could be coupled with the personal computer.

Further a docking base unit could be provided, where the docking base unit provides for powering and limited control over various interchangeable modules coupled with the docking base, and the processor of the personal computer is used to provide for much of the more sophisticated control processing as described above in connection with the processor of the docking base unit. Thus, while the term docking base unit is used to describe a device having receptacles and connectors for receiving various interchangeable computing modules, it should be understood that the term base unit as used herein is intended to include both a docking base unit as described above, and a more general purpose computer which can be programmed to provide asset tracking functions and control and historical table information for various interchangeable computing devices that are coupled to the general purpose computer.

Figure 2:
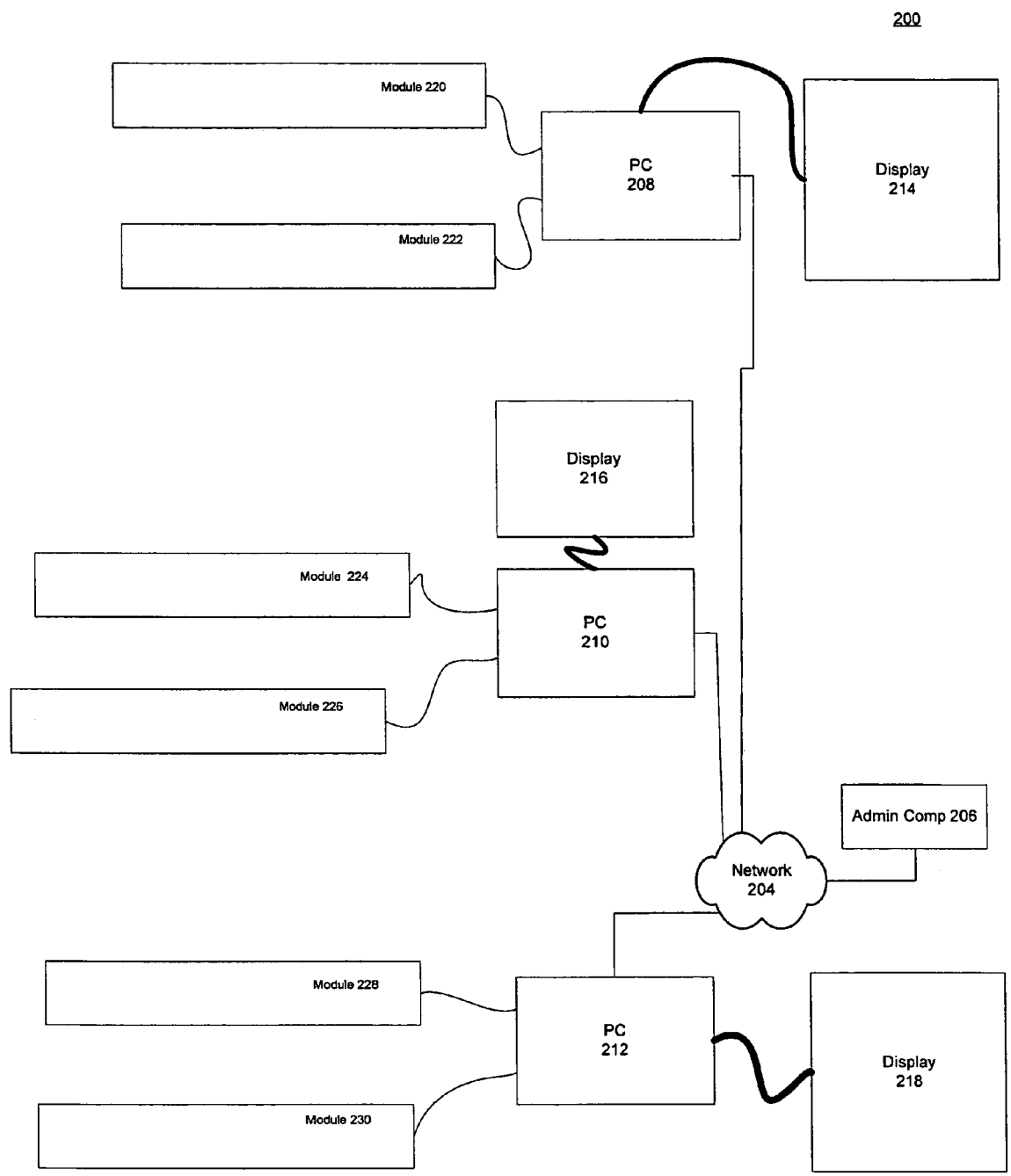
FIG. 2 shows an alternative embodiment of a system herein wherein personal computers are used as base units for interchangeable modules.

FIG. 2 shows an alternative embodiment 200 of a system herein. The system 200 includes a number of personal computers 208-212 coupled to a network 204. A number of interchangeable modules 220-230 are shown as being coupled to ports of the PCs. The PCs would also typically have user interface devices such as a keyboard and a mouse coupled to them (not shown). The PCs are also coupled with displays 214-218. The displays and interchangeable modules can include sensors, processors and memories for providing for asset tracking operations as described herein. Further the processor of the personal computer would also be programmed to provide the asset tracking functions as described herein in connection with the processor of the docking base unit.

It should be understood that the general operation of PC is widely known and typically includes a number of commonly used elements. For purposes of general reference, a short summary of such elements is provided. Generally a computer will have a bus or other communication mechanism for communicating information between different elements of the computer system. The computer has a processor coupled with the bus for processing information. The computer system also includes a main memory, such as a random access memory (RAM) or other dynamic storage device, coupled to bus for storing information and instructions to be executed by processor. The memory also may be used for storing temporary variables or other intermediate information during execution of instructions to be executed by processor. The computer system further includes a read only memory (ROM) or other static storage device coupled to bus for storing static information and instructions for processor. A storage device, such as a magnetic disk or optical disk, is provided and coupled to bus for storing information and instructions. Generally, in computer systems a display can be coupled to the bus for displaying information to a computer user. An input device, including alphanumeric and other keys, is coupled to bus for communicating information and command selections to processor. Another type of user input device is cursor control, such as a mouse, a trackball, or cursor direction keys for communicating direction information and command selections to processor and for controlling cursor movement on display. The computer system can also include a communication interface coupled to the bus. The communication interface provides a two-way data communication coupling to a network. Further the computer can be provided with number of external connections, or ports, allowing external interchangeable computing modules to be coupled with the computer. One or more processors in a multi-processing arrangement may also be employed to execute the sequences of instructions contained in main memory. In alternative embodiments, hard-wired circuitry may be used in place of, or in combination with, software instructions.

Referring back to FIG. 3, the processor 318 controls communications with other base units through a network port 338. The network port 338 is coupled to a network 340. The network could be any of a range of communication networks, including local area networks, wide area networks, wireless communication network, or a wide range of other networks. A number of different base units and other computing devices, such as servers, mainframes, and personal computers could be connected to the network 340. In one embodiment of the system herein an administrative computer 342 is provided which allows for a wide range of administrative controls and monitoring over the other devices connected to the network 340. The administrative computer could be personal computer, server, or mainframe computer, which is programmed with administrative software.

The base unit 302 can include one or more data ports 344 which allow the processor 318 to provide for direct hi-speed data communications and control over other elements of the system which are coupled to the data port 344. As shown in FIG. 3, a display 346 is coupled with the data port 344; in one embodiment this could be a serial data port. The display 346 is also coupled with the communication bus 316 to receive display image information from the processor 318 via a connection 350.

In one embodiment herein the display has asset tracking capabilities and features similar to other interchangeable modules, but some unique implementations are also provided for the display. Indeed it should be noted that one of the important elements of an embodiment herein is that extensive information regarding the operating conditions of the displays is captured. This operating condition data can then be stored and analyzed to provide for optimized utilization and servicing of the displays in the distributed computing system. Thus, the type of operational data for the displays which is captured and stored at the display level, and then transmitted for storing in a centralized database of an administrative computer, provides for significant enhancements over prior systems. In one embodiment the display 346 can include a memory, and a processor which provide for tracking and recording the use of the display. As is discussed below, the operation of a system herein provides for tracking the total operational time of the display, the operational temperature of the display, the brightness of operation, and other aspects of the operational condition of the display.

Figure 5:
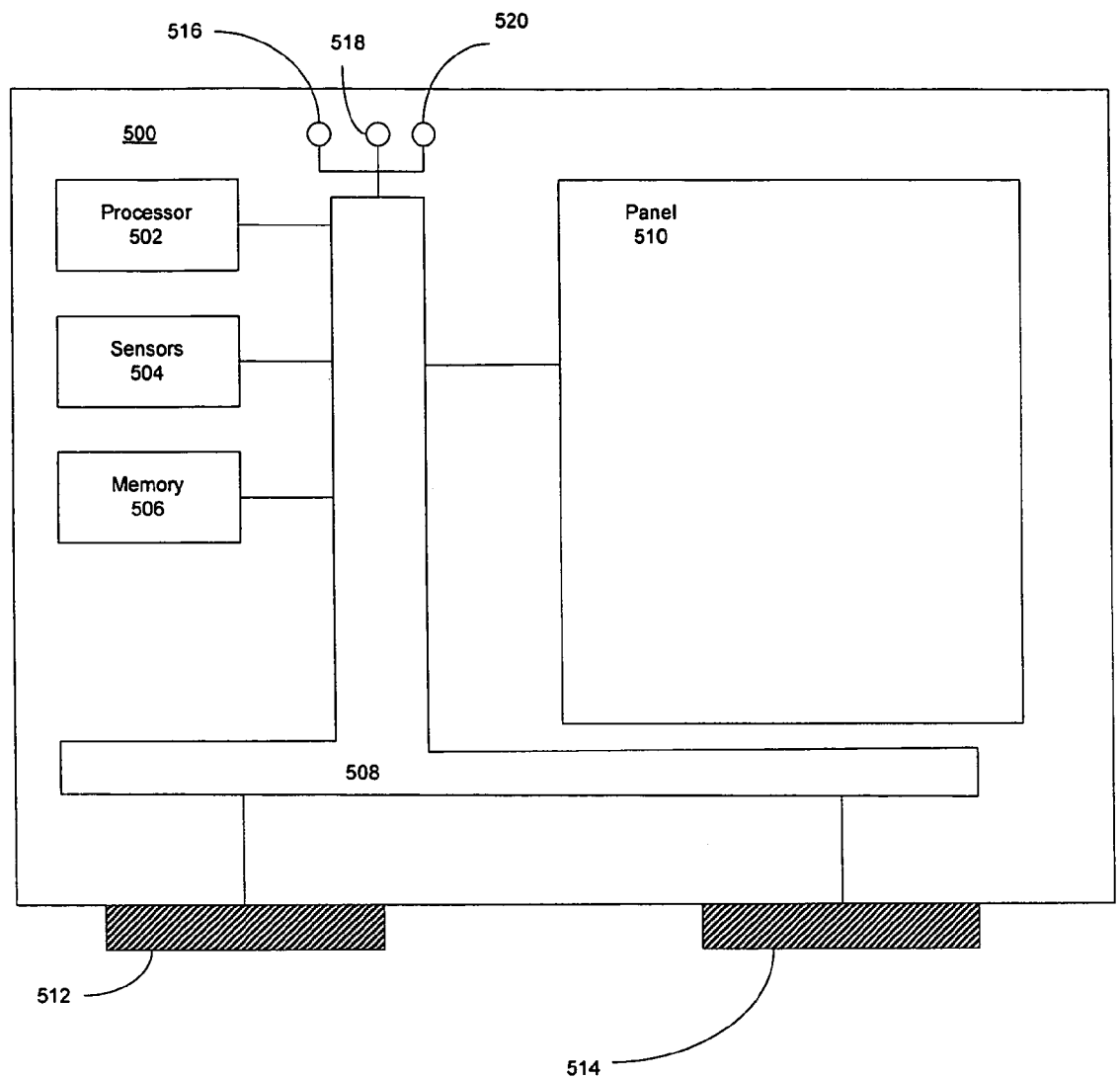
FIG. 5 shows an embodiment of a display unit herein.

FIG. 5 shows a display 500 of an embodiment herein, which could be used in a system such as shown in FIGS. 1-3. In one embodiment the display 500 includes a display panel 510 on which images and data can be displayed. The panel could be a flat panel display, or it could be a CRT type display, indeed a wide range of generally known displays panels could be used with the additional elements described herein. The display 500 would include a housing to which the display panel 510 is mounted. In the housing a number of additional elements can be provided, as is discussed below. Further, the display 500 will typically include a number of connectors for providing power and communications to the display 500. In one embodiment connector 512 is a serial data connector. The connector 514 is image data connector. This connector 514 is provided for receiving image data from the base unit which can be processed and displayed on the panel 510. A general communications bus 508 provides for communications between various elements of the display 500.

The memory 506 can be a non-volatile memory such as described above in connection with interchangeable modules. The memory can also include various history tables and security tables as described above. Additional aspects of the types of data which can be stored in the memory 506 are discussed below. Further, the display includes a processor 502, and sensor system 504 which operate cooperatively to capture and store information corresponding to the operating parameters of the display. The sensor system can include multiple sensors for sensing different parameters of the display; for example in one embodiment the sensor system would include temperature sensors and current sensors. Additionally, other elements of the display can communicate different operating conditions of the display to the processor 502. The process 502 would then process and store the operational data in the memory 506. It should be noted that processor 502 could include multiple processors or a single processor, and that it could provide for additional functions including controlling the display of images on the panel, and alternatively separate processors could be provided for controlling different functions of the display.

The memory 506 of the display is used to store a wide range of information regarding the display. This information can include detailed information regarding the operating conditions of the display over time, and can be used to enhance the overall management of the distributed system, and for identifying which displays are most likely to fail, or need servicing in the future. The memory 506 can allow a user, and/or a display manufacturer, to embed data in the memory 506 of the display which enhances the ability to track and manage assets. A number of different aspects of data which are stored in the memory 506 are discussed in connection with the tables shown in FIGS. 6A-G. In these tables a number of different column names are provided. A short discussion of the general meaning of some of the headings found in the tables is as follows: mnemonic—this is the symbolic representation that allows data to be set or get from the memory 506 via a command definition interface; description—this is the data type that the mnemonic represents; type—this is the form in which the data is stored; size—this is the byte size of the data; default—initial value for the data; mod—indicates whether or not the data can be changed during normal operations of the display.

FIG. 6A shows a data table 600 of manufacturer, or factory, data which can be stored in the memory. As shown in table 600, row 602 contains information for the display's serial number; row 604 contains information for the display's model number; row 606 contains information for the purchase order used to purchase the display; row 607 contains information for the date of purchase; row 608 contains information for the date of manufacture; row 610 contains information for the cage number, where the cage number is a reference to a number that is used to identity the entity which sold the display, 612 contains warranty information.

FIG. 6B shows a table 614 which has information pertaining to different printed circuit (PC) boards installed in the display. FIG. 6B shows a table for one PC board in the display, where similar information could be provided in additional tables if more PC boards are included in the display. As shown in table 614 row 616 contains information showing a controller board PCA number (printed circuit assembly number, which is associated with each production batch of printed circuit boards), row 618 contains information showing the firmware version for a processor on the pc board; row 620 shows the serial number which corresponds to the board; row 622 shows the model number of the board.

FIG. 6C shows a table 624 which has operating specification data for the display 500. As shown in FIG. 6C, row 626 contains information for the specified high operating temperature for the panel; row 628 contains information for the specified low operating temperature for the panel; row 630 contains information for the specified high non-operating temperature for the panel; row 632 contains information for the specified low non-operating temperature for the panel; row 634 contains information for the specified high extended operating temperature for the panel; row 636 contains information for the specified low extended operating temperature for the panel.

FIG. 6D shows a logistic data table 638 which illustrates the format of logistics data stored in log table FIG. 6E. The logistic data table 638 as shown has row 640 with date of use information; row 642 with time of use information; row 644 with elapsed usage time information; row 646 with workstation name information, where this information could refer to a base unit, including a docking base unit, or a personal computer as describe above.

The log table 648 of FIG. 6E, illustrates log table a display. Depending on the particular implementation the number of log entries can vary. As shown in table 648 the number of log entries provided for is 96. The log table provides a column 650 which shows a sequential listing of the entries; column 652 which shows the date of the use; column 654 which shows the time used for a corresponding log entry; column 656 shows the elapsed time during a corresponding use entry; and column 658 shows a host name for a host which was used with the display, where the host would typically be a base unit as described above.

FIG. 6F shows a prognostic, or operational, data table 660. The prognostic data table illustrates the type of operational prognostic data for the display which can be stored in the memory 506 of the display. This operational data can then be used to identify displays with operational histories which suggest that a particular display has been subjected to the types of usage which requires that a display be serviced or replaced. The type of operational data in table 660 is generally data which provides information that can be used to determine the operational history of the display, and can be used to make determinations as to when a display is likely to need servicing or replacement, as a result of certain operational characteristics of the display.

As shown in data table 660 the prognostic data can include a wide range of data: row 662 contains information for recording the total number of power cycles for the display; row 664 contains information for recording the cumulative time used for the display; row 666 contains information for recording the cumulative down time for the display; row 668 contains information for recording current elapsed time used; row 670 contains information for recording average temperature of operation for the display; row 672 contains information for recording highest temperature of operation for display; row 674 contains information for recording lowest temperature of operation for display; row 676 contains information for recording the time that the operating temperature for the display is above the specified value; row 678 contains information for recording the time that the operating temperature for the display is below the specified value for low operation; row 680 contains information for recording the amount of time that the display is driven at different brightness levels; row 682 contains information for recording the amount of time that the display is different temperature levels; row 684 contains information for recording the amount time that different current levels are driving the display.

Time dependent data shown in table 660, such as brightness/time shown in row 680 can have a 4-byte counter associated with each point contained within the possible range of operation. For example, in one embodiment the panel 510 of the display 500 can be driven by a power inverter to provide for 256 different brightness levels. Thus, in one embodiment a 4-byte counter is associated with each of the 256 different brightness levels. This would then translate to 1K of memory being used for the time dependent brightness data. A simple illustration of the brightness/time data is shown below:

| Inverter Step | time@inverter step |
|---|---|
| 0 | 4 bytes |
| 1 | 4 bytes |
| ... | 4 bytes |
| 255 | 4 bytes |

In one embodiment time temperature data is tracked over a range from 60° C. to −30° C., and a 91, 4 bytes values are used to store dependent temperature data. An example of such temperature/time data is shown below:

| Temperature range | time@temp |
|---|---|
| 60 | 4 bytes |
| 59 | 4 bytes |
| ... | 4 bytes |
| −30 | 4 bytes |

The display 500 includes sensors 504 which sense the various parameters which are recorded in the data tables. For example, in one embodiment the sensor system of the display includes a current sensor which senses the amount of current from an inverter which drives the panel of a display. The current sensor generates a signal which is transmitted to the processor 502, and the processor stores the corresponding data in the memory 506. Further the sensor system can include a temperature sensor and the processor operates to store data from the temperature sensor in the memory 506.

The memory 506 of the display 500 can also include a range of different user input data. FIG. 6G shows a data table 686 with examples of different possible types of user input data. This information in terms of data type and data value entries can be user definable variables. As shown in row 688 of the data table 686, the first data type can as a default be an entry which provides an ID for the particular asset, in this case the display. Row 690 provides as a default, a field for identifying a particular project that the display is associated with. Row 692 provides as a default, data for identifying a particular program which the display is associated with. Rows 694-698 identify the data type values for the different data types. Row 687 provides a field where a user can indicate if security is enable for a display. If security is enabled then certain password procedures can be followed by the processor 502 of the display, and potentially also by the processor of the base unit coupled with the display. Row 689 provides a field where a bit can be set to indicate that a user is required to login (enter a user name and password) to gain access to asset tracking stored in the memory of the display. Row 691 is a field where a bit can be set, to indicate that each users session statistics should be save. In order for the user-based statistics to be tied to a specific user, the login feature must be active so that the data can be correlated with the user identification.

Row 693 provides for an administrative password. Where the processor 502 determines that the correct administrative password has been input, then the processor can operate to allow a user to modify user definable data.

In one embodiment of a display 500 three modes of operation are provided for controlling and accessing the asset tacking operations and data of the display. These three modes are: (1) operation panel buttons, with corresponding on-screen menu displays; (2) soft menu controls; and (3) command definition interface. The operation panel buttons (OSD buttons) are interface hard buttons 516, 518 and 520 which are provided on the display itself. The OSD buttons are coupled with the processor, such that the processor receives a signal when the user presses on a selected OSD button. Using these OSD buttons a user can access the displays asset tracker operations and data, and can also interface with other controls for the display, such as brightness, contrast, and image positioning. When a user presses on the OSD buttons an on-screen menu is displayed on the panel, and the user can make various selections using the OSD buttons. The on-screen display menu can group features by category, and display the features as menu items under the category named menus. One of the top level category menus, allows a user to select an asset tracker menu, and then after selecting the asset tracker menu the user can select one of 4 submenus corresponding to 4 data categories discussed above: factory, logistic, user and prognostic. Board specific data can also be provided under a different submenu of the asset tracker category menu.

The soft menu mode of accessing asset tracker operations and data, is provided via a software application which is loaded on the base unit to which the display 500 is connected, where this base unit could be a docking base unit or a personal computer for example. In one embodiment, the soft menu data signals are transmitted from the processor of the base unit to the display processor memory via a serial data port connection between the base unit and the display. In response to the signals from the processor of the base unit, a soft menu is shown as an image on the panel of the display. In one embodiment the soft menu can be more robust and offer access to more features than the OSD buttons, in terms of providing for more options for controlling the operation of the display. However, in one embodiment whether the user is using the OSD buttons or the soft menu mode, the user will be able to access the asset control features and data of the display.

The soft menu images on the panel of the display can provide gui widgets (graphical user interface tools) such as slider bars, which allow a user to use the gui widgets to send control signal to the display through the serial port. The asset tracker functions and data are accessible through soft menu via a tabbed pane interface. The data is presented on an asset tracker specific tab. By selecting on various tabs a user can access display of asset tracker data from the categories discussed above such as factory data, logistic data, prognostic data, and user data, and provide access to elaboration when necessary. The display processor and memory maintain the asset tracker data, and the soft menu application on the base unit in conjunction with the serial data connection between the base unit and the display allows a user to access and modify asset tracker data and operations.

Figure 9A:
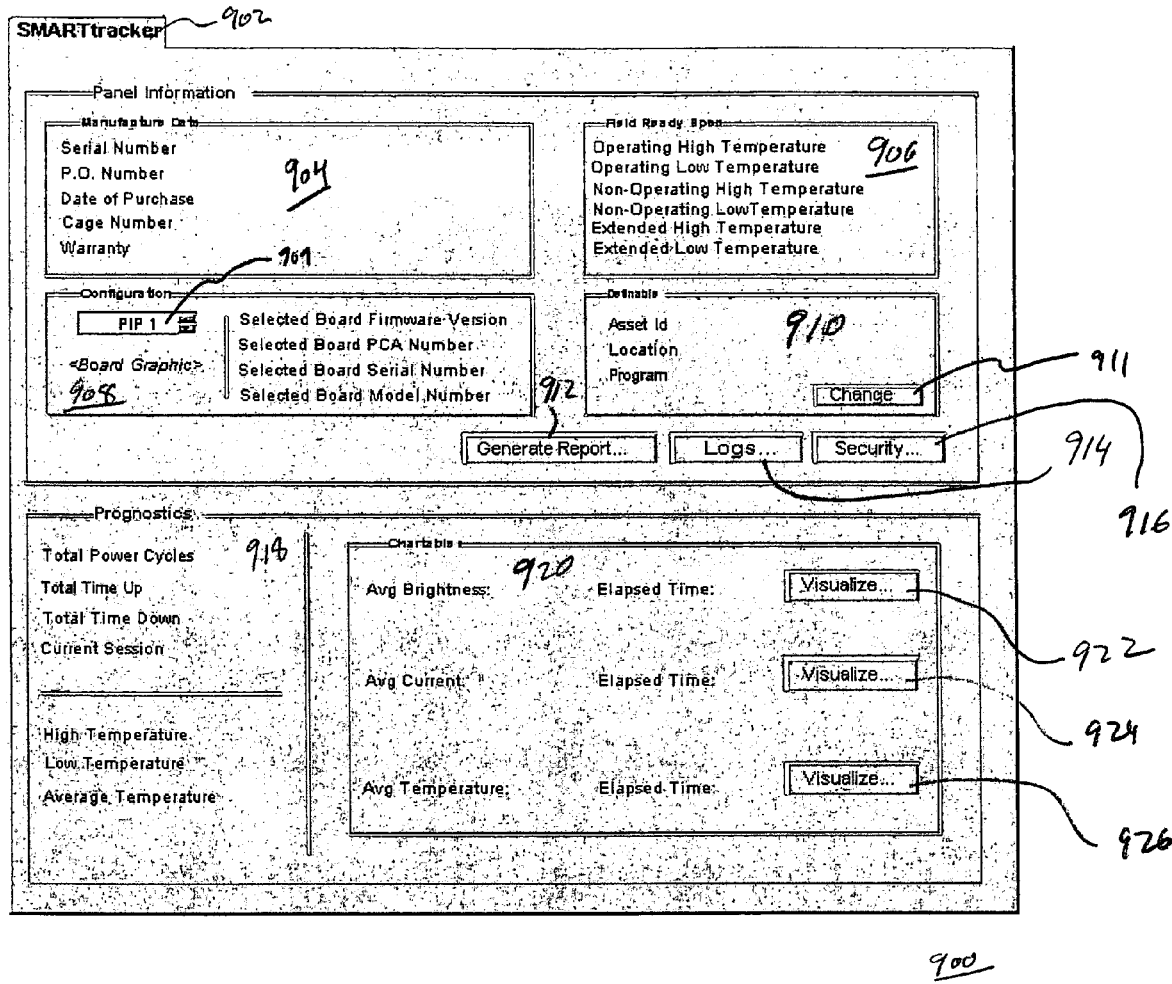
FIGS. 9A-9B show an embodiment of user interface image which can be displayed for a user accessing asset tracking information for a display.

FIG. 9A shows an embodiment of user interface image 900 which can be displayed in response to a user selecting the asset tracker tab from a plurality of other user interface tabs. In FIG. 9A the asset tracker tab 902 is identified with the text "SMARTtracker". The interface 900 could be displayed on the panel of a display in response to a user selecting the asset tracker information using the OSD buttons, or using soft menu commands. The interface provides a manufacturer data information region 904, which will display information relating to manufacturer or factory information as described above. The interface display 900 includes a display specification region 906, where specifications for the display can be shown, these specifications are discussed in more detail above. A configuration region 908 is provided which shows information for different printed circuit board assemblies which are included in the display. The configuration region 908 includes a selection field 909 where a user can select for viewing of data for different PCAs which can be included in the display assembly (for displays that have multiple PCAs).

A user definable data region 910 is provided which shows user definable data which is stored in the memory of the display. The user definable region 910 can also include a user selection device, for example a soft button 911, as shown in region 910, where a user can indicate that they want to change the input user definable data. In response to a user selection the change soft button, for example, using a cursor and a mouse, the user is presented with another menu (not shown) which allows the user to change the user definable data.

The asset tracker interface 900 can also provide the user with a mechanism which allows a user to generate reports, review and generate usage logs, and review security information for different users. Typically access to the certain asset tracker data will be limited to authorized service and security personnel. In one embodiment soft buttons are provided for generate reports 912, generate logs 914 and security reports 916. When a user selects the generate report soft button 912. In one embodiment the user will be presented with a number of different report options regarding the operating data of the display.

The asset tracker interface 900 in one embodiment provides a prognostics data region 918. The prognostics region displays prognostics, or operational, data for the display which is described above. This data can include total power cycles, total up time, and the other types of prognostics data discussed in more detail above. The asset tracker interface 900 can also include a chartable data region 920. The chartable data region 920 can also display additional prognostic data such as average brightness for a time period when the display is powered up, average current for driving the display while the display is powered up, and average operating temperature for the display. Soft buttons 922, 924 and 926 can be provided to allow a user to view charts which visually illustrate corresponding operating prognostics data.

Figure 9B:
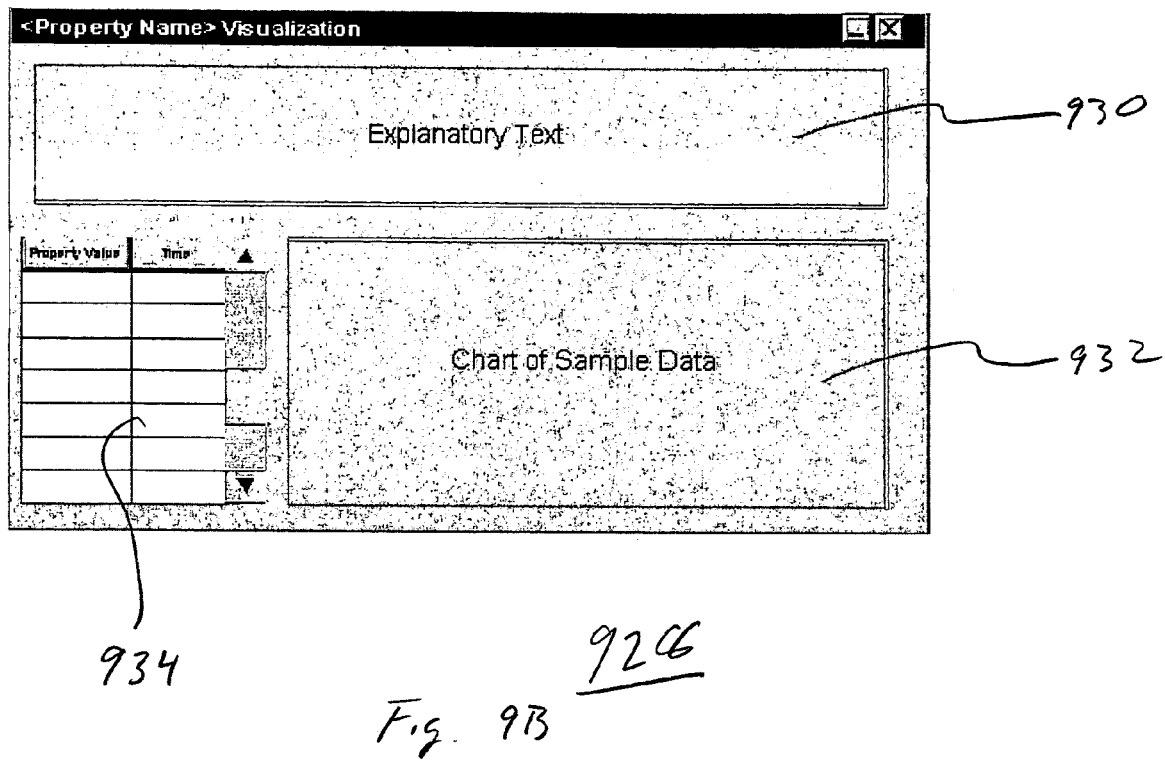

FIG. 9B illustrates a displayable form 928 for presenting a visual illustration of prognostic data in response to selecting one of the visualize soft buttons 922, 924 or 926. The form provides and explanatory text region 930 where some explanation of the data shown in the regions 932 and 934 can be provided. Region 932 can be used to provide a chart corresponding to a selected prognostic data. For example, the chart could show the variation in the operation brightness of a display over time. Region 934 provides in table form the measured prognostic data.

By providing an asset tracker user interface, a user, or a security or administrative personnel are able to review the usage and operational history of a display. This information can be very important for making a determination as to when a display should be serviced, or for determining when a display should be taken out of service.

The third mode of accessing the asset tracker functions and data of the display, is directly utilizing the commands which are utilized by the soft menu application. In this mode command definition interface (CDI) is utilized, whereby a defined command set is used to provide for communication and control from the base unit to the display. In one embodiment applications running on the base unit, other than the soft menu application, can utilize the same commands as the soft menu application to access features or data of the asset tracker. These commands can be ASCII string based commands that are issued to the display via the serial connection between the base unit and the display. These commands can operate on a simple set and get policy protocol, where the commands can either access data and/or change data of the asset tracker.

In one embodiment the protocol used for communications of the serial connection between the base unit and the display is an ASCII only protocol. The table below shows the structure of packets sent between the base unit and the display over the serial connection.

| Name | Size | Description |
|---|---|---|
| Status | 1 | Panel Status bits. |
| Command Length | 1 | The length of the command. |
| Command | N | The command |
| Argument length | 1 | The length in bytes of the transmission. This length only includes the data sent as an |

-continued

| Name | Size | Description |
|---|---|---|
| | | argument to the command. |
| Argument Data | N | The argument data for the command. |
| End of Transmission | 1 | The byte used to signal the end of the transmission. |

Where a communication between the base unit and the display results in an error, in one embodiment the following error codes are generated:

| Error Name | Error Code | Description |
|---|---|---|
| UNDEFINED_REQ | −1 | If a set or get is issued for an unknown data type. |
| TIMEOUT | −2 | Returned if the panel times our waiting for data. |
| GENERIC | 0x15 | Catch all error. |

In one embodiment the data connection between the base unit and the display can be a serial RS-232 cable and connector. The commands sent from the base unit to the display, can include commands to set data in the display memory (set data type command); and commands to retrieve data (get data type command) from the display memory. In one embodiment appending an ASCII 's' (0x73) to any of the modifiable mnemonics will set the data type, and appending an ASCII 'g' (0x67) to any of the mnemonics will get the data type. Another transmission type from the base unit to the display is a general command transmission. General commands are those commands that do not act on any of the defined data types, such that the command does not directly read or write any of the data defined in the data tables.

The display processor will sit and listen to the serial data port, capturing bytes until it encounters a carriage-return (ASCII code—0x0d). At that point, the data captured up until then will be processed.

If the command from the base unit is a "GET" command, then the display processor will: (1) go into a busy state (2) parse the packet received from the base unit; (3) retrieve the requested data from the display memory; (4) build a response packet which has the same structure as outlined above, but the response is contained in the argument data location—the response is the value of the data type associated with the mnemonic; (5) transmit response packet through data port to base unit; (6) display processor 502 returns to a listening mode. If the command is a "SET" command, then the display processor will: (1) go into a busy state; (2) parse transmission packet; (3) use data in argument of received packet to set the data type associated with the mnemonic specified; (4) build the response packet which has the same structure as above but an ACK (0x06) is placed in the argument data; (5) transmit response packet; (6) return to a listening state.

If the panel experiences an error, the error code corresponding to the error will be sent. Once the panel receives a carriage-return (0x0d), the panel goes into a busy state, and additional data sent to the panel is ignored. The panel remains in its busy state until the response packet is sent. In one embodiment the packets transmitted between the base unit and the display are sent over the through the data port as ASCII hexadecimal character string sequences.

The communication between the display and the base unit is important, in that it allows for asset tracking functions and operational data to be controlled and accessed through the base unit. One powerful feature of an embodiment herein is that the processor of the base unit can periodically access all of the prognostic and operational data from the display, and store it in a memory of the base unit. The base unit can then process the prognostic and operational data, and send the information via the network 204 to the an administrative computer 206. The administrative computer can be programmed with a software application to continuously, or periodically, request data from the base units, and then store the data received from the base units for each of the displays and other interchangeable modules coupled with the base units. Further, the processors of the base units could be programmed to automatically periodically communicate with the administrative computer through network to provide asset tracking data to the administrative computer. The administrative computer can then build and maintain an asset database for each of the assets, such as base units, and interchangeable modules including displays which are part of the system.

In one embodiment the administrative computer can be a personal computer with the elements described above in connection with a computer system. The administrative computer can store all of the operational data for each of the plurality of displays. Service or security personnel will typically be provided with access to the administrative computer, and can access the operational data for the displays through a user interface similar to that described in connection with FIGS. 9A-9B herein. Through the administrative computer a user could generate a report based on the operational data of the plurality of displays, where the report would rank the displays based on total amount of usage over a user selected time period. For example, a user might want to rank the displays based on total usage over the past 30, 60, 90 or 120 days, or perhaps even a much longer time period. Those displays with higher usage would then be possible candidates for servicing, or further analysis in terms of performance. Those displays with very low usage, might be considered for redeployment in areas where display needs area greater.

Additionally, other operating conditions of the display could be used for ranking the displays. For example, it has been found that displays which show a significant drop in current driving the panel, are displays which are generally more likely to fail in the near term. Thus, another report can provide a ranking of displays based on rate of decrease in current driving the panel. Rankings of the displays could also be generated on any of the other operational parameters of the display.

Figure 7B:
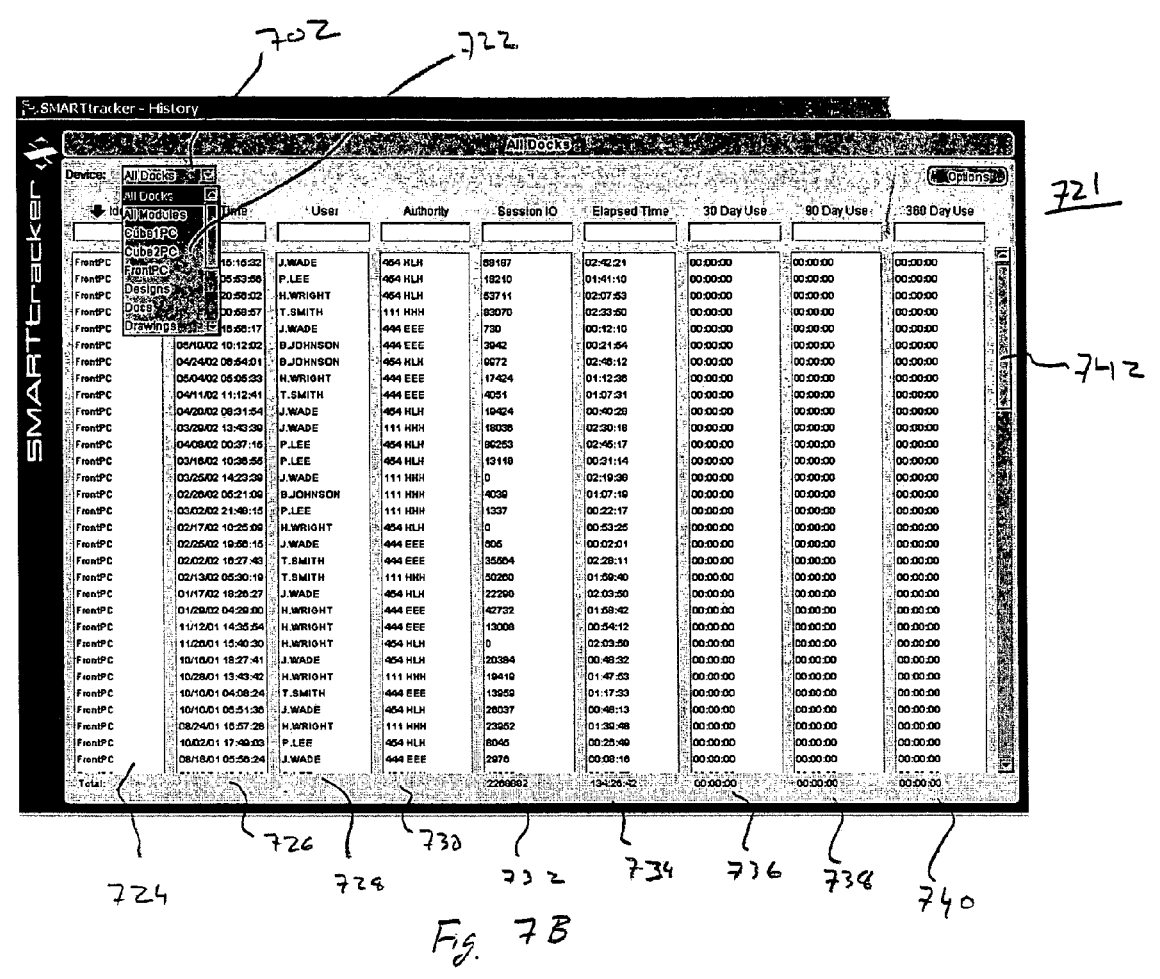
Figure 7C:
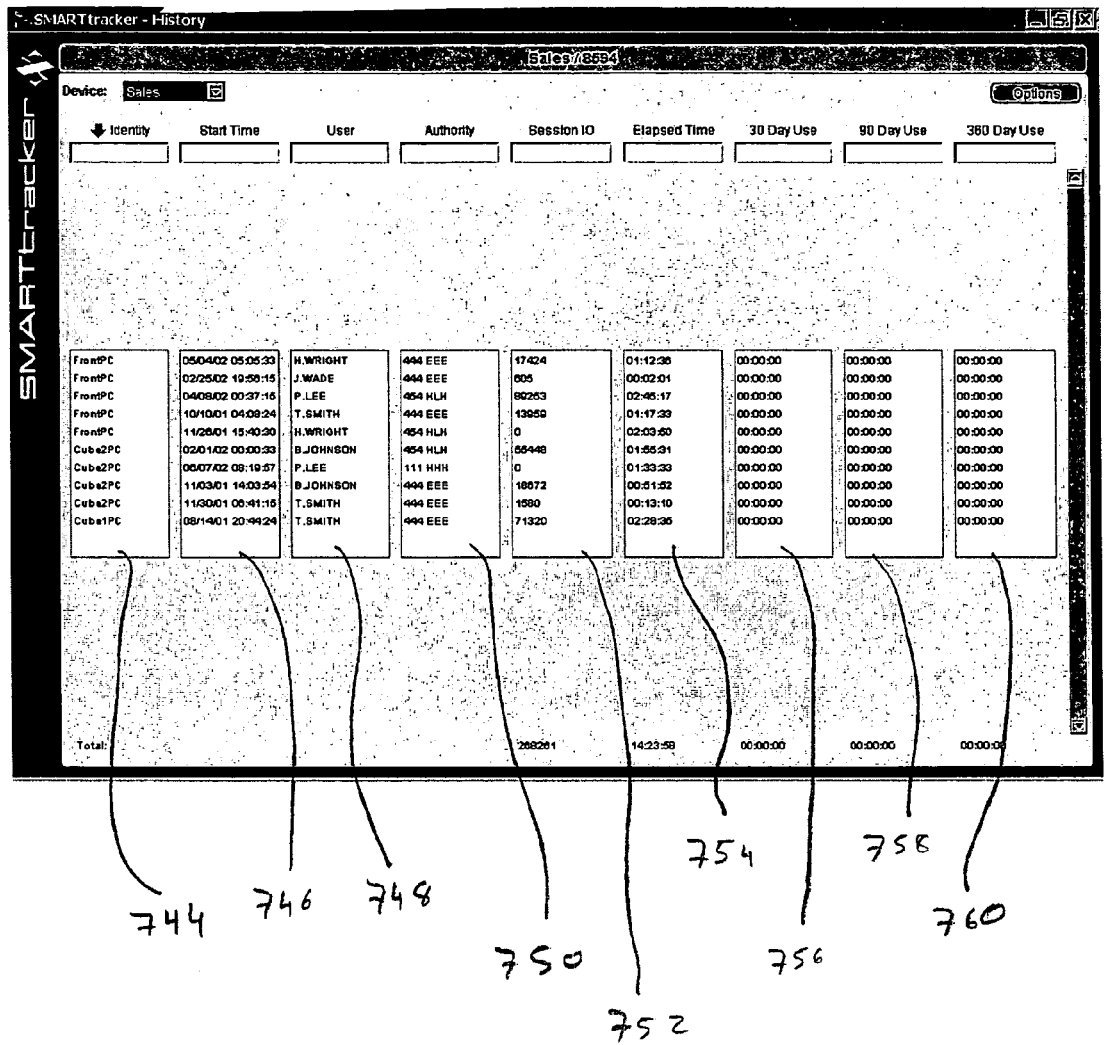

FIGS. 7A-7C show different images which can be displayed to a user using the administrative computer. These images generally relate to information and reports shown in connection with interchangeable storage modules used with base units. FIG. 7A shows a table in image 700 which a user of the administrative computer can view. The table provides a device selection window 702 where a user can select a device for which the user wants to see tacking information. As shown in 700 in the selection window the user has selected a viewing of information for all modules. Column 704 includes a listing of all interchangeable modules for which there is data. The modules area provided with user recognizable names such as "strategy" "sales" ... "payroll". Column 706 shows the time at which a user started using the corresponding module. Column 708 shows the user who was using the module at a particular time. Column 710 shows the authorization code for the corresponding user. Column 712 shows the number of I/O operations perform during an operating session of the module. Note the I/O operations are generally input-output operations, which can correspond to the reading and writing of information to and from a storage device. Thus, column 712 is likely to be more relevant for a storage device interchangeable module, than a module such as a display.

Column 714 shows the elapsed or total time for a user session with a device. Column 716 shows the amount time a particular module has been used doing the previous 30 days. Columns 718 and 720 show the amount of time a module has been used to time periods of the previous 90 days, and 360 days. In one embodiment a user will be able to select the order of the columns displayed in the image 700. Further, a user can select the criteria for ordered ranking of the modules. For example, a user could select to have the modules ranked from the top of the column to the bottom of the column based on the amount of usage over the previous, 30 days, or 90 days, or 360 days.

FIG. 7B shows another screen shot 721 or image which can be shown on a display of the administrative computer. In the device selection window 702 the user has selected a pull down menu 722 which provides a listing of different modules and groups of modules which the user can have displayed in table. As shown the user has highlighted the selection "All Docks". In one embodiment this selection would correspond to a selection of all base units of the system. The displayed table of FIG. 7B has column 724 which shows listing of all base units. As shown only data corresponding to the base unit "FrontPC" is displayed, but a user could use the slider bar 742 to scroll down the table and view information for all of the other base units. Column 728 shows a listing of all users who have logged into the FrontPC docking base. Columns 726 and 734 show the time a user logged in and the elapsed time that a user was logged in on the base unit. Column 730 shows the users authorization code. Column 732 shows the number of I/O operations implemented during the users session. Columns 736, 738 and 740 show the amount of time a user was logged onto the base unit over time periods of 30 days, 90 days, and 360 days.

It should be noted that screen shot images shown in FIGS. 7A-7C are examples of possible displays of information for the modules and the security data for the distributed system. Many variations of the tables shown in these figures would be possible, and a user could further provide with specific unique queries to search the data base containing.

FIG. 7C shows a screen shot where a user has selected the specific module "Sales" in the device selection window 702. In this case the Sales module is an interchangeable hard disk drive module which can be used with different base units. Column 744 shows the different base units that the Sales module has been connected with. Column 746 shows the different time periods when different users logged onto the corresponding base unit and accessed the Sales module. Column 748 shows the user who was logged on at the corresponding time period. Column 750 shows the users authorization code. Column 752 shows the number of I/O operations implemented by the user with the Sales module. Column 754 shows the elapsed time of the user's session. Columns 756, 758 and 760 show the users total usage on the base unit with the sales module connected to it over time periods of 30, 90 and 360 days.

Figure 8:
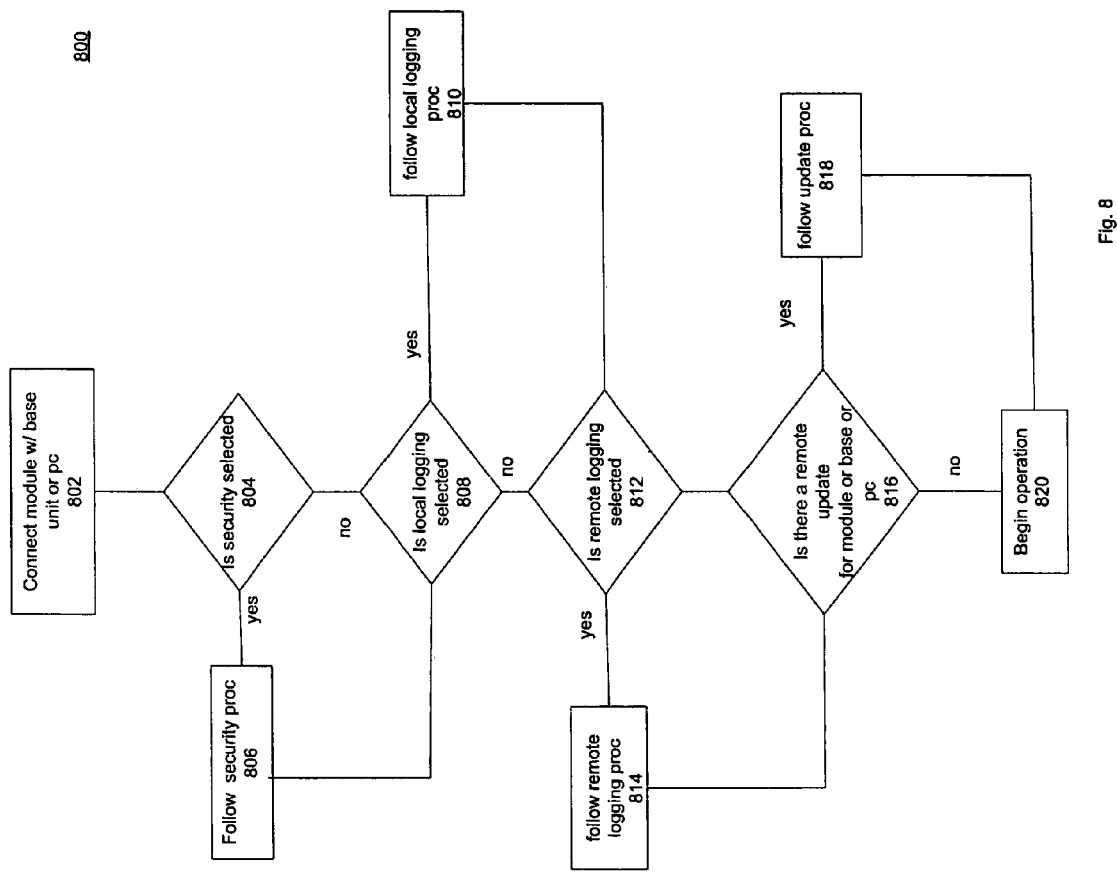
FIG. 8 shows an embodiment of a method herein.

FIG. 8 shows a method 800 of operation of an embodiment herein where a interchangeable module is initially connected with a base unit. At step 802 an interchangeable module is connected with a base unit. Initially the base unit will query the interchangeable module determine 804 if security login procedures have been selected for the interchangeable module. If the security login procedures have been selected for the module, then the specified login procedures are followed 806. These procedures could include for example requiring the user to input a user id and password. Following the successful completion of the initial security procedure, the base unit makes a determination as to whether local logging has been selected 808 for the interchangeable module. If security procedures have not been selected for the interchangeable module, then the next step is to proceed directly to a determination of whether local logging has been selected. To determine if local logging procedures are to be followed, the processor can query the data stored in the memory of the interchangeable module to determine if the local logging procedures are to be followed. Further, the different procedure tables of the base unit may indicate that regardless of the settings for the interchangeable module, local logging procedures are to be followed 810.

The local logging procedures will generally at a minimum require that the connection of the interchangeable module to the base unit be recorded in the historical operation data of the base unit, so there is a record of the usage of the interchangeable module with the particular base unit. Further, local logging procedures can be much more detailed, and provide for the transmission and storage of all operation data for the interchangeable module in the memory of the base unit.

After following the local logging procedures have been followed, or it has been determined that local logging has not been selected, the next step in the process is to determine 812 if remote logging has been selected. If remote logging has been selected, then the remote logging procedures are followed 814. These procedures can include transmitting asset tracking data for the interchangeable module from the base unit to the administrative computer.

In one embodiment of the invention it is possible that the administrator compute could transmit instructions to each of the base units, to update certain administrative settings for a particular interchangeable module. At the time these instructions are transmitted, the interchangeable module, might be in storage, or otherwise not connected with any of the base units. In such a situation, each of the base units will store the administrative instructions in memory, and then subsequently when a base unit determines that the particular interchangeable module has been connected to it, that there is an update from the remote administrator computer, then the base unit will operate to update 818 the administrative settings for the interchangeable module. Once the update has been completed or it has been determined that there is no update for the interchangeable module, then normal operation of the interchangeable module coupled with the base unit can begin 820.

It should be noted that the above descriptions illustrate certain embodiments for illustrative purposes and one of skill in the art would recognize that specific implementations of the invention herein could be implemented in different ways. Thus, while various embodiments of the present invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus, the present invention should not be limited by any of the above-described exemplary embodiments, but should be defined only in accordance with the following claims and their equivalents.

What is claimed is:

1. A distributed computing system, including:
    a plurality of base units, each base unit including a processor;
    a plurality of displays wherein each of the base units is connected with a corresponding display, and wherein a corresponding base unit and the corresponding display are connected such that image information from the base unit can be displayed on a panel of the display;
    wherein each of the plurality of displays includes a processor, a memory and a sensor system which are communicatively coupled with each other;
    wherein the connection between each base unit and its corresponding display provides for operational data communication between each display and its corresponding base unit;
    wherein the sensor system of the display and the processor of the display operate to cooperatively sense operational characteristics of the display, and store corresponding operational data of the display in the memory of the display, and the processor of the display operates to transmit the operational data for the display to the processor of the corresponding base unit;
    wherein the processor of the base unit is operable to receive the operational data transmitted by the processor of the display;
    wherein each of the base units is coupled to a network;
    an administrative computer is coupled to the network; and
    wherein the processor of each of the base units is operable to transmit operational data through the network to the administrative computer.

2. The distributed computing system of claim 1, wherein:
    the administrative computer includes a database which is operable to store the operational data for each of the plurality of displays which is transmitted to the administrative computer through the network;
    the administrative computer further including a processor which is operable to analyze the operational data stored in the database and to rank the displays in accordance with a user selected criteria.

3. The distributed computing system of claim 2, wherein the user selected criteria is a total usage time for each of the displays over a user selected time period.

4. The distributed computing system of claim 2, wherein the user selected criteria is a total usage time for each of the displays over a time period selected from the following group of different time periods 30 days, 90 days, and 360 days.

5. The distributed computing system of claim 1, wherein the memory of each of the displays stores serial number data for the display; specification data for the display; operational data for the display; and user definable data for the display.

6. The distributed computing system of claim 1, wherein each of the displays includes a panel which can be driven at a plurality of specified brightness levels, and wherein for each brightness level a corresponding counter is provided in the memory of the display, and each counter stores a value corresponding to the amount of time that the display was at the corresponding brightness level.

7. The distributed computing system of claim 1, wherein:
    the sensor system includes a temperature sensor, and the temperature sensor operates to detect a temperature of the display; and
    wherein the operational data stored in the memory of the display includes temperature information from the sensor system.

8. The distributed computing system of claim 7, wherein the temperature information stored in memory tracks the temperature of the display over a range temperatures, and the memory tracks discrete temperature intervals within the range of temperatures, and for each discrete temperature interval a corresponding counter is provided in the memory.

9. The distributed computing system of claim 1, wherein:
each display is provided with operation panel buttons which are coupled with the processor of the display, and a user can use the operation panel buttons to access a operational data for the display which is stored in the memory of the display.

10. The distributed computing system of claim 1, wherein:
each display in provided with at least first connector which is connected with the corresponding base unit for the display, and the first connector provides for a serial data connection between the display unit and the corresponding base unit, and the operational data is transmitted through the serial data connection.

11. A method of tracking operational information in a distributed computing system, the method comprising:
  providing a plurality of base units, each unit including a processor;
  connecting each base unit with a corresponding display, wherein each display includes a memory;
  sensing operational parameters for a display, and storing the operational parameter data corresponding to the sensed operational parameters in the memory of the display;
  transmitting the operational parameter data from the memory of a display to the base unit to which the display is connected;
  connecting each of the base units to a network;
  connecting an administrative computer to the network;
  transmitting operational data for each of the displays from its corresponding base unit to the administrative computer; and
  analyzing the operational data for each of the displays, and ranking displays based on a user selected criteria.

12. The method of claim 11, wherein the user selected criteria is a total usage time for each display over a user selected time period.

13. The method of claim 11, wherein the user selected criteria is a total usage time for a display over a time period selected from the following group of different time periods 30 days, 60 days, 90 days, and 120 days.

14. The method of claim 11, further including:
  in the memory of each display storing a serial number for the display, specification data for the display, operational data for the display, and user definable data for the display.

15. The method of claim 11, further including:
  storing data in the memory of the display which indicates a plurality of levels of brightness operation of the display, and an amount of time at which the display is operated at each of the different plurality of levels of brightness.

16. The method of claim 11, further including:
  sensing an operating temperature for the display;
  storing in the memory of the display an amount of time that display is operated at a particular temperature.

17. The method of claim 11, further including:
  transmitting image information from a base unit to its corresponding display;
  transmitting operational data from the display to its corresponding base unit, wherein the transmission of the operational data is done through a serial data connection between the base unit and the display.

* * * * *